(12) United States Patent
Fischer et al.

(10) Patent No.: US 8,534,704 B2
(45) Date of Patent: Sep. 17, 2013

(54) ACTIVE AIR BAG VENT

(75) Inventors: Kurt F. Fischer, Leonard, MI (US); Douglas M. Gould, Lake Orion, MI (US); Roy C. Turnbull, Shelby Township, MI (US); John Klakulak, Clinton Township, MI (US)

(73) Assignee: TRW Vehicle Safety Systems, Inc., Washington, MI (US)

( * ) Notice: Subject to any disclaimer, the term of this patent is extended or adjusted under 35 U.S.C. 154(b) by 155 days.

(21) Appl. No.: 13/114,134

(22) Filed: May 24, 2011

(65) Prior Publication Data

US 2012/0299277 A1 Nov. 29, 2012

(51) Int. Cl.
*B60R 21/26* (2011.01)
*B60R 21/16* (2006.01)

(52) U.S. Cl.
USPC ........................................ 280/736; 280/743.2

(58) Field of Classification Search
USPC .................... 280/732, 736, 739, 743.1, 743.2
See application file for complete search history.

(56) References Cited

U.S. PATENT DOCUMENTS

| | | | |
|---|---|---|---|
| 6,095,557 A | 8/2000 | Takimoto et al. | |
| 6,773,030 B2* | 8/2004 | Fischer | 280/739 |
| 7,059,634 B2* | 6/2006 | Bossecker et al. | 280/739 |
| 7,328,915 B2 | 2/2008 | Smith et al. | |
| 7,584,993 B2 | 9/2009 | Yamaji et al. | |
| 7,628,422 B2 | 12/2009 | Fukawatase et al. | |
| 7,883,110 B2* | 2/2011 | Pausch | 280/739 |
| 2004/0012179 A1* | 1/2004 | Pinsenschaum et al. | 280/739 |
| 2004/0017069 A1 | 1/2004 | Fischer | |
| 2004/0130135 A1 | 7/2004 | Ekdahl | |
| 2006/0151979 A1* | 7/2006 | DePottey et al. | 280/739 |
| 2007/0045997 A1* | 3/2007 | Abe et al. | 280/729 |
| 2007/0145729 A1 | 6/2007 | Ishiguro et al. | |
| 2008/0284147 A1 | 11/2008 | Goto et al. | |
| 2009/0026743 A1 | 1/2009 | Arez | |
| 2009/0033081 A1 | 2/2009 | Fischer et al. | |
| 2009/0289444 A1* | 11/2009 | Keshavaraj | 280/736 |
| 2010/0078924 A1* | 4/2010 | Mitsuo et al. | 280/743.2 |
| 2010/0090450 A1 | 4/2010 | Webber | |
| 2010/0201107 A1 | 8/2010 | Abe et al. | |
| 2012/0235393 A1* | 9/2012 | Fisher et al. | 280/742 |

FOREIGN PATENT DOCUMENTS

| | | |
|---|---|---|
| DE | 10332549 | 3/2004 |
| DE | 102004014681 | 7/2005 |
| DE | 60304267 | 12/2006 |
| DE | 102008021623 | 11/2008 |

* cited by examiner

*Primary Examiner* — Faye M. Fleming
(74) *Attorney, Agent, or Firm* — Tarolli, Sundheim, Covell & Tummino LLP (57) ABSTRACT

An apparatus (10) for helping to protect an occupant (20) of a vehicle (12) includes an inflatable vehicle occupant protection device (14) comprising a panel (114) that at least partially defines an inflatable volume (54) of the protection device. A vent (100) includes a sidewall that extends through the panel (114) and defines a passage (134) for venting inflation fluid from the inflatable volume (54). The vent (100) includes a first portion (102) extendable inside the inflatable volume (54) and an opposite second portion (104) extendable outside the inflatable volume. The vent (100) has an open condition in which the first portion (102) is maintained inside the inflatable volume (54) and thereby permits venting of inflation fluid through the passage (134), and a closed condition in which the first portion (102) is inverted and positioned in the second portion (104) thereby blocking inflation fluid from venting through the passage (134).

37 Claims, 7 Drawing Sheets

ACTIVE AIR BAG VENT

FIELD OF THE INVENTION

The present invention relates to an apparatus for helping to protect an occupant of a vehicle. More particularly, the present invention relates to a vent for releasing inflation fluid from an inflatable air bag.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

It may be desirable to vent inflation fluid from an air bag in order to achieve desired performance characteristics, such as desired ride-down characteristics. To achieve this function, the air bag may include vents that are actuatable actively in response to sensed vehicle conditions, occupant conditions, or a combination of sensed vehicle and occupant conditions. Additionally or alternatively, the air bag and vents may be configured so that the vent is actuated passively in response to vehicle conditions, occupant conditions, or a combination of vehicle and occupant conditions.

SUMMARY OF THE INVENTION

The present invention relates to an apparatus for helping to protect an occupant of a vehicle. The apparatus includes an inflatable vehicle occupant protection device including a panel that at least partially defines an inflatable volume of the protection device. A vent comprises a sidewall that extends through the panel and defines a passage for venting inflation fluid from the inflatable volume. The vent includes a first portion extendable inside the inflatable volume and an opposite second portion extendable outside the inflatable volume. The vent has an open condition in which the first portion is maintained inside the inflatable volume and thereby permits venting of inflation fluid through the passage, and a closed condition in which the first portion is inverted and positioned in the second portion thereby blocking inflation fluid from venting through the passage.

The present invention also relates to an apparatus for helping to protect an occupant of a vehicle. The apparatus includes an inflatable vehicle occupant protection device and a vent for venting inflation fluid from the protection device. The vent includes a conduit having a first portion extending inside the protection device and an opposite second portion extending outside the protection device. A tether has a first end portion connected to the first portion of the vent and a second end portion releasably anchored in the vehicle. The vent has an open condition in which the tether is anchored and thereby maintains the first portion positioned in the protection device so that inflation fluid vents through the conduit. The vent has a closed condition in which the tether is released and thereby permits the first portion to become inverted and positioned in the second portion, which blocks inflation fluid from venting through the conduit.

The present invention also relates to an apparatus for helping to protect an occupant of a vehicle. The apparatus includes an inflatable vehicle occupant protection device and a vent comprising first and second tubular portions. The second tubular portion extends outside the protection device. The vent has an open condition in which the first tubular portion extends inside the protection device and thereby permits venting of inflation fluid through the vent. The vent has a closed condition in which the first tubular portion is inverted and extends at least partially into the second tubular portion. In the closed condition, the second tubular portion blocks inflation fluid from venting through the vent.

The present invention also relates to an apparatus for helping to protect an occupant of a vehicle. The apparatus includes an inflatable vehicle occupant protection device and a vent comprising first and second conical portions. The second conical portion extends outside the protection device. The vent has an open condition in which the first conical portion extends inside the protection device and thereby permits venting of inflation fluid through the vent. The vent has a closed condition in which the first conical portion is inverted and extends at least partially into the second conical portion. In the closed condition, the second conical portion blocks inflation fluid from venting through the vent.

The present invention further relates to an apparatus for helping to protect an occupant of a vehicle. The apparatus includes an inflatable vehicle occupant protection device and a vent for venting inflation fluid from an inflatable volume of the protection device. The vent includes at least one panel having opposed first and second portions that define a discharge chamber. The second portion includes at least one vent opening that provides fluid communication between the inflatable volume and the discharge chamber and a discharge opening that provides fluid communication between the discharge chamber and the exterior of the protection device via an opening in a panel of the protection device. The vent has an open condition in which the first portion of the at least one panel is spaced from the second portion of the at least one panel and thereby allows inflation fluid flow from the inflatable volume into the discharge chamber via the at least one vent opening and to the exterior of the protection device via the discharge opening and the opening in the protection device panel. The vent has a closed condition in which the first portion of the at least one panel is urged against the second portion of the at least one panel and thereby blocks inflation fluid flow from the inflatable volume into the discharge chamber via the at least one vent opening.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

An apparatus 10 for helping to protect an occupant 20 of a vehicle 12 includes an inflatable vehicle occupant protection device in the form of an air bag 14. In the embodiment illustrated in FIGS. 1A-2B, the air bag 14 is a passenger frontal air bag for helping to protect an occupant 20 of a seat 22 on a passenger side 24 of the vehicle 12.

The air bag 14 may be part of an air bag module 30 that includes an inflator 32 and a support or housing 34 for the air bag and inflator. The air bag 14 has a stored condition, indicated by dashed lines a 14 in FIG. 1A, in which the air bag is folded and placed in the housing 34. The module 30 is mounted to an instrument panel 36 of the vehicle 12 in a known manner. The housing 34 helps contain and support the air bag 14 and inflator 32 in the instrument panel 36.

An air bag door 40 is releasably connected to the instrument panel 36 and/or the housing 34. In a closed condition, the air bag door 40 forms a cover for the module 30 and helps enclose the air bag 14 in the stored condition in the housing 34. The door 40 is movable to an opened condition illustrated in FIGS. 1B and 2A to uncover an opening 44 through which the air bag 14 may be deployed from the stored condition in the housing 34. The door 40 may be connected to the instrument panel 36 either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 also includes a sensor/controller, illustrated schematically at 50, for sensing an event for which inflation of the air bag 14 is desired, such as a collision, and providing an actuation signal to the apparatus 10 in response to the sensed event. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Figure 1A:
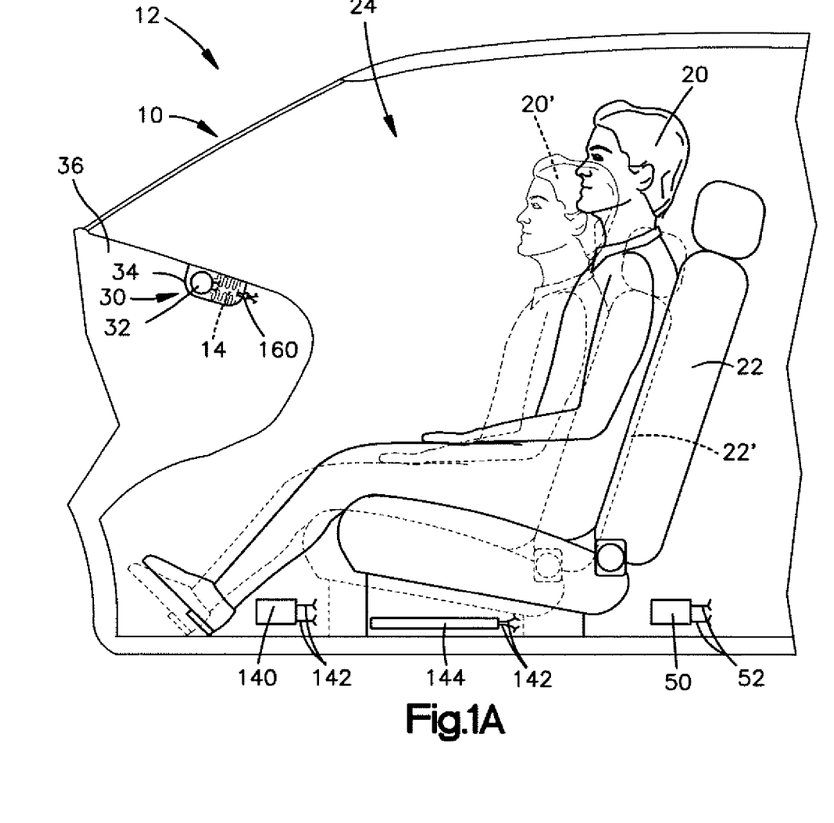
FIG. 1A is a schematic side view of an apparatus for helping to protect an occupant of a vehicle according to a first embodiment of the invention, illustrating the apparatus in a deflated and stored condition.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated and deployed condition illustrated in solid lines in FIG. 1. The air bag 14, while inflated, helps protect the vehicle occupant 20 from impacts with parts of the vehicle 12, such as the instrument panel 36.

According to the present invention, the apparatus 10 includes a vent 100 that is actuatable to release inflation fluid from the air bag 14. The structure of the vent 100 is illustrated schematically in FIGS. 3A and 3B. The vent 100 has a generally conical configuration forming a conduit that extends through an opening 116 in a wall 114 of the air bag 14. The opening 116 has a shape that mates with the cross-sectional shape of the of the vent 100 at its interface with the wall 114. Thus, in the embodiment of FIGS. 3A and 3B, the opening 116 is circular.

Figures 3A, 3B:
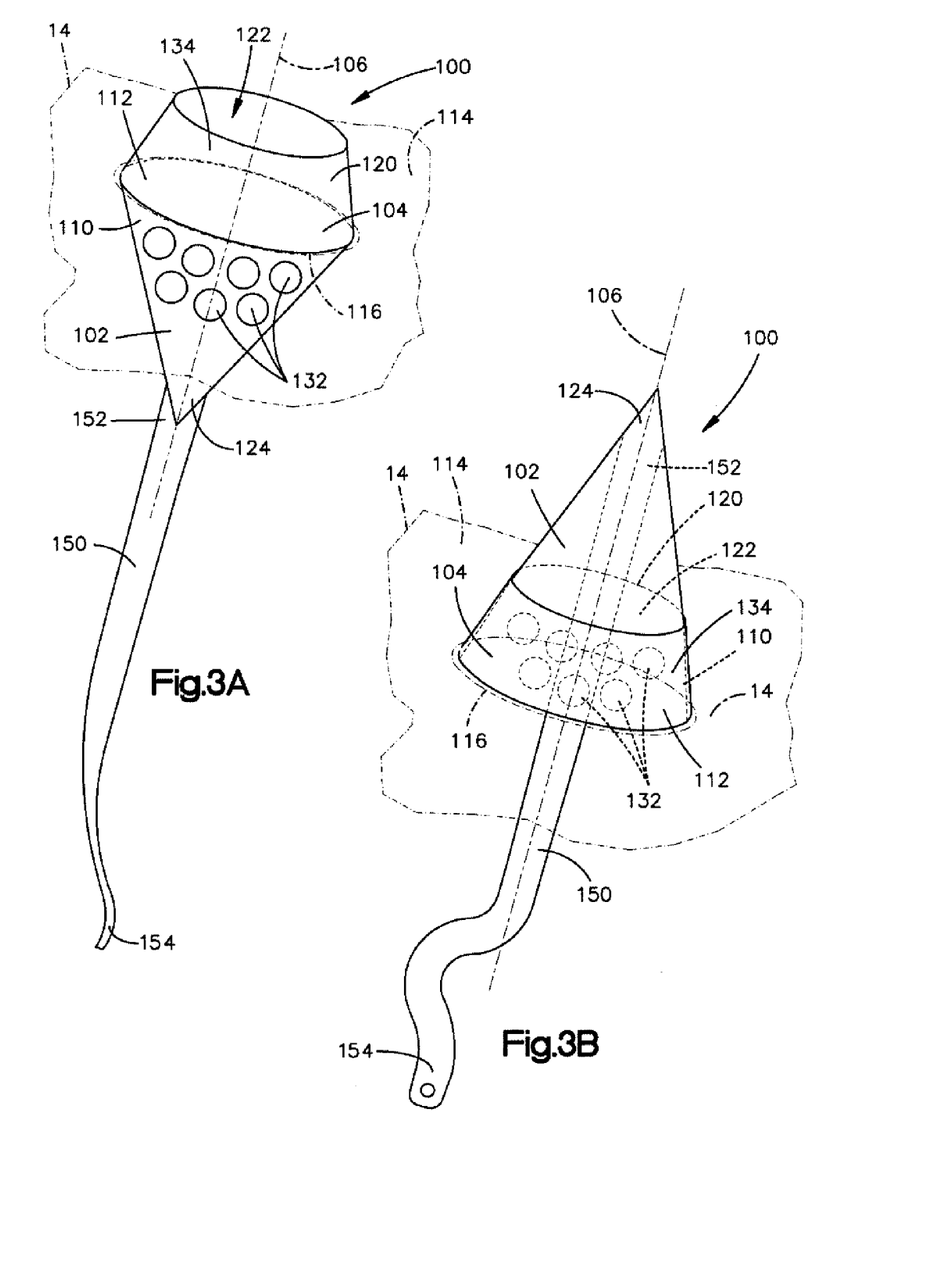
FIGS. 3A and 3B are magnified views illustrating a portion of the apparatus in different conditions, according to the first embodiment of the present invention.

Referring to FIGS. 3A and 3B, the vent 100 comprises a first portion comprising a conical inner wall 102 and a second portion comprising a frusto-conical outer wall 104. The inner and outer walls 102 and 104 share a common central axis 106. As shown in FIGS. 3A and 3B, respective base portions 110 and 112 of the inner and outer walls 102 and 104 meet each other at the air bag wall 114, where they are connected to the air bag 14 about the periphery of the opening 116 in the wall 114. As shown in FIGS. 3A and 3B, the inner and outer walls 102 and 104 may have congruent or substantially congruent configurations in which their respective base portions 110 and 112 have equal or substantially equal diameters, and the respective walls extend at equal or substantially equal angles with respect to the common axis 106.

The inner wall 102 tapers down from the base portion 110 and extends away from the air bag wall 114 into the inflatable volume 54 of the air bag 14. The outer wall 104 tapers down from the base portion 112 and extends away from the air bag wall 114 and away from the air bag 14 outside the inflatable volume 54 of the air bag 14. The frusto-conical outer wall 104 has an open end portion 120 that defines an outlet 122 of the vent 100. The outer wall 104 defines a passage or discharge chamber 134 through which inflation fluid may travel en route to the outlet 122. The inner wall 102 has a closed end portion 124 to which a first end portion 152 of a vent tether 150 is connected. The inner wall 102 includes a plurality of vent openings 132 spaced about the circumference of the inner wall. In the embodiment illustrated in FIGS. 3A and 3B, the openings 132 have a generally circular shape. The openings 132 could, however, have alternative configurations. For example, the openings could comprise elongated slots, X-shaped slits, cross-shaped slits, T-shaped slits, Y-shaped slits, or other suitably shaped openings.

The vent 100 has an open condition, illustrated in FIG. 3A, and a closed condition, illustrated in FIG. 3B. In the open condition of FIG. 3A, the vent tether 150 tensions or otherwise pulls/maintains the inner wall 102 in an open condition positioned at least partially within the inflatable volume 54 of the air bag 14. The vent tether 150 substantially or completely prevents the inner wall 102 from entering the discharge chamber 134. In the open condition, fluid communication is established between the inflatable volume 54 and the atmosphere surrounding the air bag 14 via the vent openings 132, the discharge chamber 134, and the outlet 122. In the open condition, the vent tether 150 maintains the inner wall 102 in this open condition extending into the inflatable volume 54 against the pressure of inflation fluid in the air bag 14.

In the closed condition of FIG. 3B, the vent tether 150 does not tension or otherwise pull/maintain the inner wall 102 in the open condition positioned within the inflatable volume 54 of the air bag 14. The inner wall 102 is thus free to move in response to inflation fluid pressure in the inflatable volume 54 of the air bag 14. Under the pressure of inflation fluid in the inflatable volume 54, the inner wall 102 moves to a closed condition positioned at least partially within the discharge chamber 134 defined by the outer wall 104. In the closed condition, the inner wall 102 is inverted from the open condition. Since the inner wall 102 and outer wall 104 have congruent or substantially congruent configurations, the inner wall 102 when in the closed condition mates with, overlies, and follows the contour of the outer wall 104, thereby forming a tight and close fit between the walls.

According to the present invention, in the closed condition of the vent 100, the vent openings 132 are positioned against corresponding portions of the outer wall 104. Since the conical inner wall 102 is closed at the end portion 124, the inflation fluid pressure in the air bag presses the portions of the inner wall 102 surrounding the vent openings 132 against the corresponding portions of the outer wall 104. As a result, the outer wall 104 constrains the inner wall 102 and blocks or substantially blocks fluid communication between the inflatable volume 54 and the atmosphere surrounding the air bag 14. Inflation fluid venting is thus blocked in the closed condition of the vent 100.

Those skilled in the art will therefore appreciate that the vent 100 vents inflation fluid from the inflatable volume 54 of the air bag 14 when the vent tether 150 maintains the vent, particularly the inner wall 102, in the open condition (FIG. 3A). Those skilled in the art will further appreciate that the vent 100 blocks inflation fluid venting from the inflatable volume 54 of the air bag 14 when the vent tether 150 releases the vent, particularly the inner wall 102, to move to the closed condition (FIG. 3B).

Since movement of the inner wall 102 that places the vent 100 in the closed condition occurs passively in response to inflation fluid pressure in the inflatable volume 54 (more precisely in response to differential pressure between the inflatable volume 54 inside the air bag 14 and the atmosphere surrounding the air bag 14), the apparatus 10 can be configured such that actuation of the vent 100 depends on whether the vent tether 150 is anchored in the vehicle 12. Those skilled in the art will appreciate that the air bag 14 can be configured such that, when the vent tether 150 is anchored, movement of the inner wall 102 during air bag deployment can cause the vent tether to become tensioned and thereby maintain the vent 100 in the open condition as described above. Similarly, those skilled in the art will appreciate that the air bag 14 can be configured such that, when the vent tether 150 is released from being anchored, the inner wall 102 is similarly released, thereby permitting the inner wall, and thus the vent 100, in the closed condition as described above.

The vent tether 150 is an adaptive tether in the sense that the vent tether adapts the condition of the vent 100 depending on vehicle conditions, occupant conditions, or a combination of vehicle and occupant conditions at the time of the occurrence of the event for which inflation and deployment of the air bag is triggered. To this end, the vent tether 150 has a second end portion 154, opposite the first end portion 152, that is anchored to the vehicle 12 via an actuatable device 160 (see FIGS. 1A-2B). The actuatable device 160 is supported by structure in the vehicle 12, such as the housing 34. The actuatable device 160 may, for example, be an actuatable fastener, such as a pyrotechnic bolt, that is actuatable to break or release the connection of the second end portion 154 of the vent tether 150 to the housing 34. Those skilled in the art will appreciate that an alternative device could be substituted for the actuatable fastener. For example, the actuatable device 160 may comprise an actuatable latch, a solenoid mechanism, or actuatable cutters or shears.

Figure 1B:
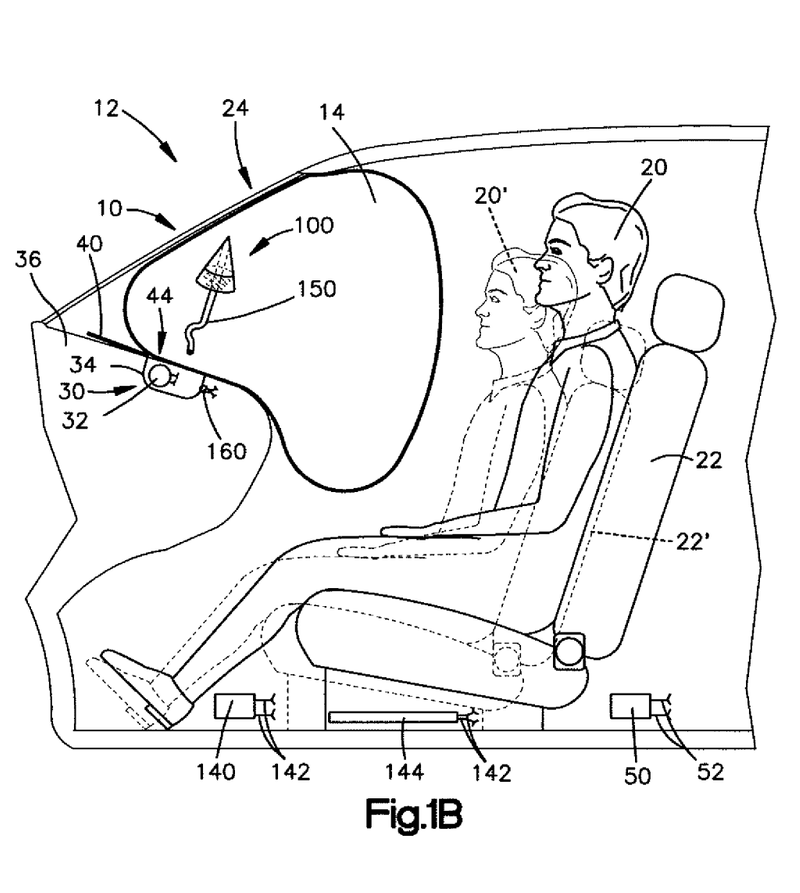
FIG. 1B is a schematic side view of the apparatus of FIG. 1A, illustrating the apparatus in a first inflated and deployed condition.
Figure 1C:
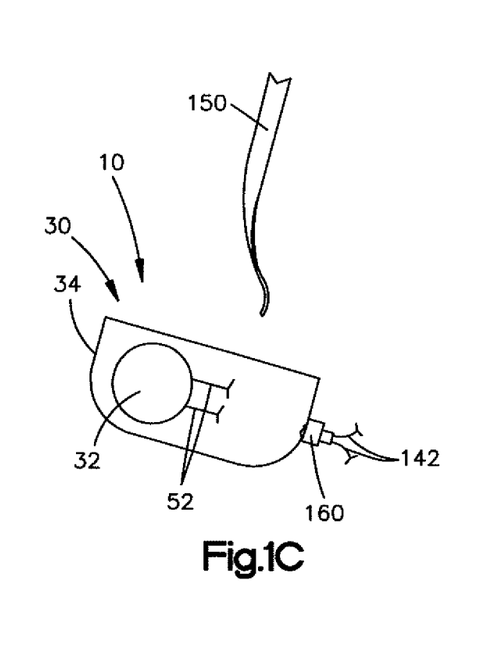
FIG. 1C is a magnified view of a portion of the apparatus of FIG. 1B.

In an actuated condition of the actuatable device 160, the connection of the vent tether 150 to the vehicle 12 is broken or released. This is shown in FIGS. 1B and 1C. As shown in, FIGS. 1B and 1C, the actuatable device 160, when actuated, releases the connection between the second end portion 154 of the vent tether 150 and the vehicle 12. This releases the inner wall 102 of the vent 100, which then moves to the closed condition (see also FIG. 3B) under the pressure of inflation fluid in the inflatable volume 54 of the air bag 14. The vent 100 is thus placed in the closed condition in response to actuation of the actuatable device 160.

Figure 2A:
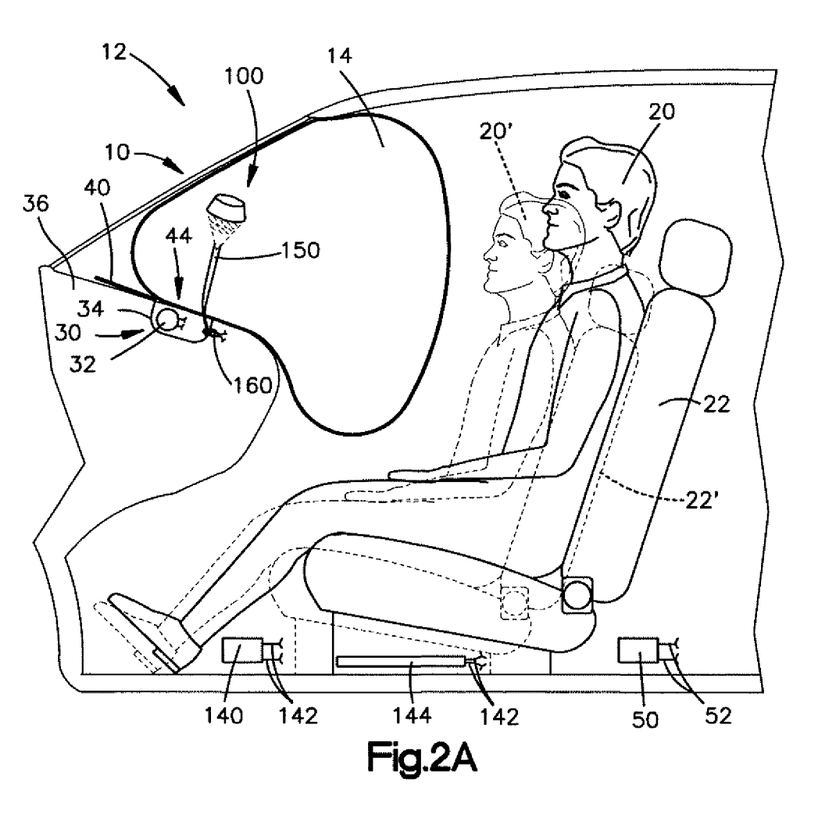
FIG. 2A is a schematic side view of the Apparatus of FIG. 1A illustrating the apparatus in a second inflated and deployed condition.
Figure 2B:
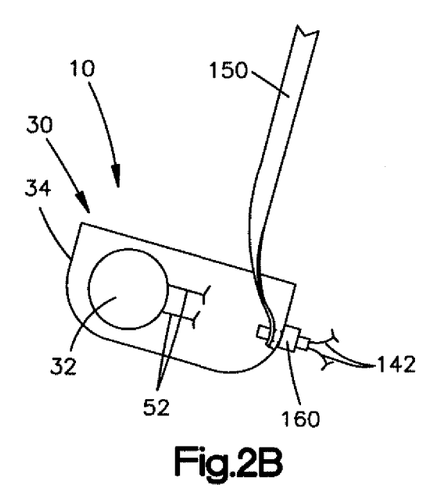
FIG. 2B is a magnified view of a portion of the apparatus of FIG. 2A.

In an non-actuated condition of the actuatable device 160, the anchoring of the vent tether 150 in the vehicle 12 is maintained. This is shown in FIGS. 2A and 2B. As shown in, FIGS. 2A and 2B, the actuatable device 160, when in the non-actuated condition, maintains the connection between the second end portion 154 of the vent tether 150 and the vehicle 12. This maintains the inner wall 102 of the vent 100 in the open condition (see also FIG. 3A) against the pressure of inflation fluid in the inflatable volume 54 of the air bag 14. The vent 100 is thus maintained in the open condition in response to non-actuation of the actuatable device 160.

When an event occurs which inflation of the air bag 14 is desired, the apparatus 10 of the present invention responds to vehicle conditions, occupant conditions, or both to help control inflation and deployment of the air bag and actuation of the vent 100. According to the embodiment of FIGS. 1A-3B, this control is implemented actively based on sensed conditions in the vehicle 12. To achieve this function, the apparatus 10 also includes a controller, illustrated schematically at 140, for actuating the actuatable device 160. The controller 140 is operatively connected to the actuatable device 160 via lead wires 142. Upon the occurrence of an event for which inflation of the air bag 14 is desired, such as a collision, the controller 140 determines whether to actuate the actuatable device 160 (and thus the vent 100) based on vehicle conditions, occupant conditions or both vehicle and occupant conditions at the time of the sensed event.

The controller 140 is also operatively connected to sensors that provide signals that the controller can use to infer or determine the vehicle/occupant conditions. For example, as shown in FIGS. 1A-2B, the apparatus 10 may include one or more sensors 144 that can provide a signal to the controller 140 via lead wires 142 that is indicative of a sensed seat position, a sensed weight on the vehicle seat 22, a sensed presence of an occupant 20 on the vehicle seat, or a combination of these conditions. Through the controller 140 and sensors 144, the apparatus 10 may, for example, be adapted to respond to the size or position of the vehicle occupant 20. Alternative sensors, such as optical or ultrasonic sensors, may also be used to determine presence and/or position of an occupant 20 on the seat 22.

For example, referring to FIGS. 1A-2B, the occupant identified at 20' and shown in dashed lines is positioned relatively close to the instrument panel 36 and therefore relatively close to the air bag module 30. This may be the case, for example, with a relatively small occupant, such as a child or small female occupant. This is shown by comparison to the large occupant illustrated in solid lines at 20, which may for example be an average size or large adult male. Those skilled in the art will appreciate that the smaller occupant 20' may adjust the vehicle seat 22' to a position forward of the seat 22 of the larger occupant 20. The smaller occupant 20' may also place less weight on the vehicle seat 22'.

According to the present invention, upon sensing the forward positioned occupant 20' and in response to sensing the event for which occupant protection is desired, the controller 140 maintains the actuatable device 160 in the non-actuated condition, which maintains the vent 100 in the open condition. The apparatus 10 is thus adapted to vent inflation fluid from the inflatable volume 54 in response to sensing the forward positioned occupant 20'. Upon sensing the rearward positioned occupant 20 and in response to sensing the event for which occupant protection is desired, the controller 140 actuates the actuatable device 160, which places the vent 100 in the closed condition. The apparatus 10 is thus adapted to block inflation fluid venting from the inflatable volume 54 in response to sensing the rearward positioned occupant 20.

The adaptive functionality of the apparatus 10 is not limited to forward/rearward positioned occupant position per se. For example, the apparatus 10 could function similarly to vent inflation fluid from the air bag 14 in response to sensing the presence of a child safety seat positioned on the vehicle seat 22. This may be determined, for example, via a seatbelt tension sensor (not shown) operatively connected to the controller 140. As another example, the vent tether 150 could function similarly to control venting of the air bag 14 in the event of an extremely large occupant, without regard to the forward/rearward position of the seat 22, based on the sensed weight on the seat. As a further example, the vent tether 150 could function similarly to control venting of the air bag 14 in the event of an occupant positioned away from a normal seating position, such as a leaned-over or leaned-forward position, without regard to the forward/rearward position of the seat 22 and without regard to the occupant's size, as determined by an occupant position sensor (e.g., an optical or ultrasonic sensor), or a seatbelt extension sensor (not shown) operatively connected to the controller 140.

Figure 4A:
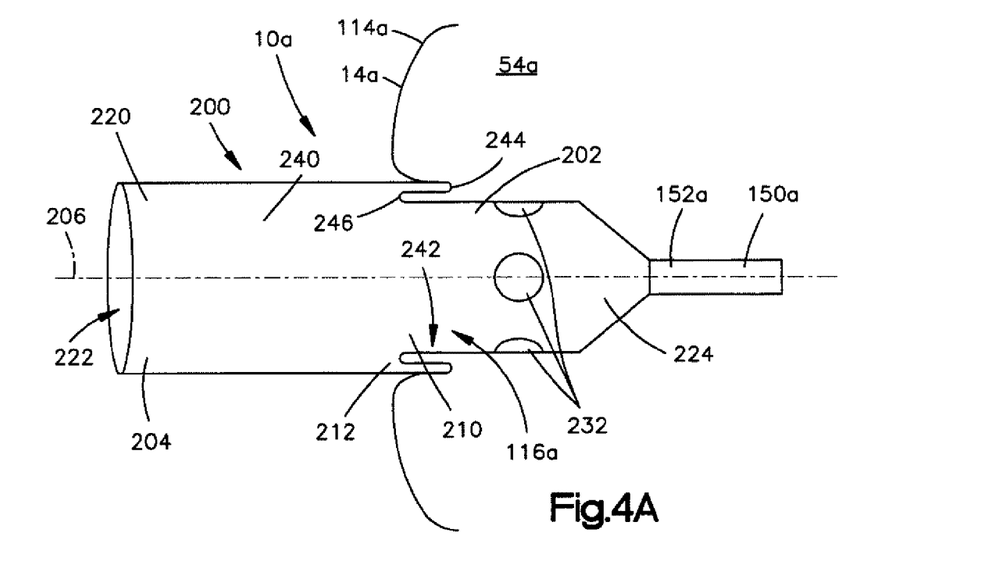
FIGS. 4A and 4B are magnified views illustrating a portion of the apparatus in different conditions, according to a second embodiment of the present invention.
Figure 4B:
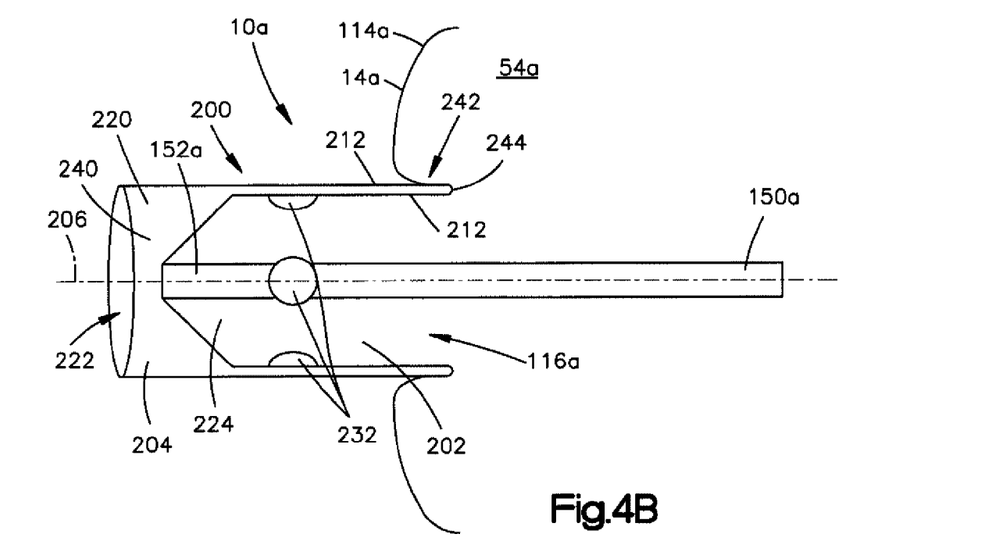

A second embodiment of the present invention is illustrated in FIGS. 4A and 4B. Certain components in FIGS. 4A and 4B are similar or identical to components of FIGS. 1A-3B. The suffix "a" is added to the reference numbers of these similar or identical components in FIGS. 4A and 4B to avoid confusion. The apparatus 10a of the second embodiment includes an air bag 14a that is fitted with a vent 200 having a configuration that differs from the vent 100 illustrated in FIGS. 1A-3B.

Referring to FIGS. 4A and 4B, the vent 200 of the second embodiment is actuatable to release inflation fluid from the air bag 14a. The vent 200 has a generally tubular configuration forming a conduit that extends through a wall 114a of the air bag 14a. This construction may be achieved, for example, by positioning the vent 200 through an opening 116a in the air bag wall 114a and connecting (e.g., via stitching) the vent to the air bag material surrounding the opening. In this instance, the opening 116a may have a shape (e.g., circular) that mates with the cross-sectional shape of the tubular structure of the vent 200.

The vent 200 has a generally tubular configuration. In the embodiment illustrated in FIGS. 4A and 4B, the vent 200 comprises a tubular structure including a cylindrical first portion comprising an inner wall 202 and a cylindrical second portion comprising an outer wall 204. The inner and outer walls 202 and 204 share a common central axis 206. As shown in FIGS. 4A and 4B, respective base portions 210 and 212 of the inner and outer walls 202 and 204 meet each other at the opening 116a in the air bag wall 114a. As shown in FIGS. 4A and 4B, the inner and outer walls 202 and 204 may have congruent or substantially congruent configurations. The inner and outer walls 202 and 204 may have the same or substantially the same diameter or, alternatively, the outer wall 204 may have a diameter that is smaller than the inner wall 202. To this end, the inner and outer walls 202 and 204 may comprise portions of a single cylindrical tubular structure, as shown in FIGS. 4A and 4B.

The inner wall 202 has a closed end portion 224 that is tapered down and connected to the vent tether 150a. The outer wall 204 has an open end portion 220 that defines an outlet 222 of the vent 200. The outer wall 204 defines a passage or discharge chamber 240 through which inflation fluid travels en route to the outlet 222. The inner wall 202 has a closed end portion 224 to which an end portion 152a of a vent tether 150a is connected. The inner wall 202 includes a plurality of vent openings 232 spaced about the circumference of the inner wall. In the embodiment illustrated in FIGS. 4A and 4B, the openings 232 have a generally circular shape. The openings 232 could, however, have alternative configurations. For example, the openings could comprise elongated slots, X-shaped slits, cross-shaped slits, T-shaped slits, Y-shaped slits, or other suitably shaped openings.

At an interface 242 between the base portions 210 and 212 of the inner and outer walls 202 and 204, respectively, the inner wall 202 is folded along a first fold 244 into the discharge chamber 240 formed by the outer wall 204 and then folded back along a second fold 246 so that the inner wall 202 extends back toward or into the inflatable volume 54a of the air bag 14a. At the interface 242, the base portion 210 of the inner wall 202 extends along and inside the base portion of the outer wall 204. This folded/turned-in configuration facilitates a telescoping movement of the inner wall 202 into and out of the discharge chamber 240.

The vent 200 has an open condition, illustrated in FIG. 4A, and a closed condition, illustrated in FIG. 4B. In the open condition of FIG. 4A, the vent tether 150a tensions or otherwise pulls/maintains the inner wall 202 in an open condition positioned at least partially within the inflatable volume 54a of the air bag 14a. In the open condition, the inner wall 202 is thus at least partially telescoped out of the discharge chamber 240, as shown in FIG. 4A. In fact, in the open condition, the inner wall 202 may be completely telescoped out of the discharge chamber 240 (not shown) such that the folds 244 and 246 are unfolded completely and the walls 202 and 204 are coextensive.

In the open condition, the vent tether 150a substantially or completely prevents the inner wall 202 from entering the discharge chamber 240. In the open condition, the vent 200 provides fluid communication between the inflatable volume 54a and the atmosphere surrounding the air bag 14a via the vent openings 232, the discharge chamber 240, and the outlet 222. In the open condition, the vent tether 150a maintains the inner wall 202 in this open condition extending into the inflatable volume 54a against the pressure of inflation fluid in the air bag 14a.

In the closed condition of FIG. 4B, the vent tether 150a does not tension or otherwise pull/maintain the inner wall 202 in the open condition positioned within the inflatable volume 54a of the air bag 14a. The inner wall 202 is thus free to move in response to inflation fluid pressure in the inflatable volume 54a of the air bag 14a. Under the pressure of inflation fluid in the inflatable volume 54a, the inner wall 202 moves (i.e., telescopes) to a closed condition positioned at least partially within the discharge chamber 240 defined by the outer wall 204. In the closed condition, the inner wall 202 is inverted from the open condition. In fact, in the closed condition of FIG. 4B, the inner wall 202 is inverted to the point where the inner wall telescopes completely into the chamber 240 and unfolds completely. Since the inner wall 202 and outer wall 204 have congruent or substantially congruent configurations, the inner wall 202 when in the closed condition mates with, overlies, and follows the contour of the outer wall 204, thereby forming a tight and close fit between the walls.

According to the present invention, in the closed condition of the vent 200, the vent openings 232 are positioned against corresponding portions of the outer wall 204. Since the inner wall 202 is closed at the end portion 224, the inflation fluid pressure in the air bag presses the portions of the inner wall 202 surrounding the vent openings 232 against the corresponding portions of the outer wall 204. As a result, the outer wall 204 constrains the inner wall 202 and blocks or substantially blocks fluid communication between the inflatable volume 54a and the atmosphere surrounding the air bag 14a. Inflation fluid venting is thus blocked in the closed condition of the vent 200.

Those skilled in the art will therefore appreciate that the vent 200 vents inflation fluid from the inflatable volume 54a of the air bag 14a when the vent tether 150a maintains the vent, particularly the inner wall 202, in the open condition (FIG. 4A). Those skilled in the art will further appreciate that the vent 200 blocks inflation fluid venting from the inflatable volume 54a of the air bag 14a when the vent tether 150a releases the vent, particularly the inner wall 202, to move to the closed condition (FIG. 4B).

Since movement of the inner wall 202 that places the vent 200 in the closed condition occurs passively in response to inflation fluid pressure in the inflatable volume 54a (more precisely in response to differential pressure between the inflatable volume 54a inside the air bag 14a and the atmosphere surrounding the air bag 14a), the apparatus 10 can be configured such that actuation of the vent 200 depends on whether the vent tether 150a is anchored in the vehicle. Those skilled in the art will appreciate that the air bag 14a can be configured such that, when the vent tether 150a is anchored, movement of the inner wall 202 during air bag deployment can cause the vent tether to become tensioned and thereby maintain the vent 200 in the open condition as described above. Similarly, those skilled in the art will appreciate that the air bag 14a can be configured such that, when the vent tether 150a is released from being anchored, the inner wall 202 is similarly released, thereby permitting the inner wall, and thus the vent 200, to move to the closed condition as described above.

The vent 200 of the embodiment of FIGS. 4A-4B can be adapted to respond to vehicle conditions, occupant conditions, or both to help control inflation and deployment of the air bag 14a. Since the vent 200, as described above, is placed in the open condition in response to the vent tether 150a being anchored, and is placed in the closed condition in response to release of the vent tether 150a, those skilled in the art will appreciate that control of the vent 200 can be implemented actively based on sensed conditions in the vehicle in a manner similar or identical to that described above in regard to the vent 100 of the embodiment of FIGS. 1A-3B.

To achieve this function, the apparatus 10a of may also include the controller(s), sensor(s), wiring, and any other components necessary to actively control the vent 200 based on sensed vehicle conditions, occupant conditions, or a combination of vehicle and occupant conditions when the event for which inflation and deployment of the air bag 14a occurs. As described in regard to the embodiment of FIGS. 1A-3B, these sensed conditions may, for example, include a sensed seat position, a sensed weight on the vehicle seat, a sensed presence of an occupant on the vehicle seat, or a combination of these conditions. The apparatus 10a may thus, for example, be adapted to respond to the size or position of the vehicle occupant. Alternative sensors, such as optical or ultrasonic sensors, may also be used to determine presence and/or position of an occupant on the seat.

Additionally, the adaptive functionality of the apparatus 10a is not limited to forward/rearward positioned occupant position per se. For example, the apparatus 10a could function similarly to vent inflation fluid from the air bag in response to sensing the presence of a child safety seat positioned on the vehicle seat. This may be determined, for example, via a seatbelt tension sensor (not shown) operatively connected to the controller. As another example, the vent tether 150a could function similarly to control venting of the air bag 14a in the event of an extremely large occupant, without regard to the forward/rearward position of the seat, based on the sensed weight on the seat. As a further example, the vent tether 150a could function similarly to control venting of the air bag 14a in the event of an occupant positioned away from a normal seating position, such as a leaned-over or leaned-forward position, without regard to the forward/rearward position of the seat and without regard to the occupant's size, as determined by an occupant position sensor (e.g., an optical or ultrasonic sensor), or a seatbelt extension sensor (not shown) operatively connected to the controller.

Figure 5A:
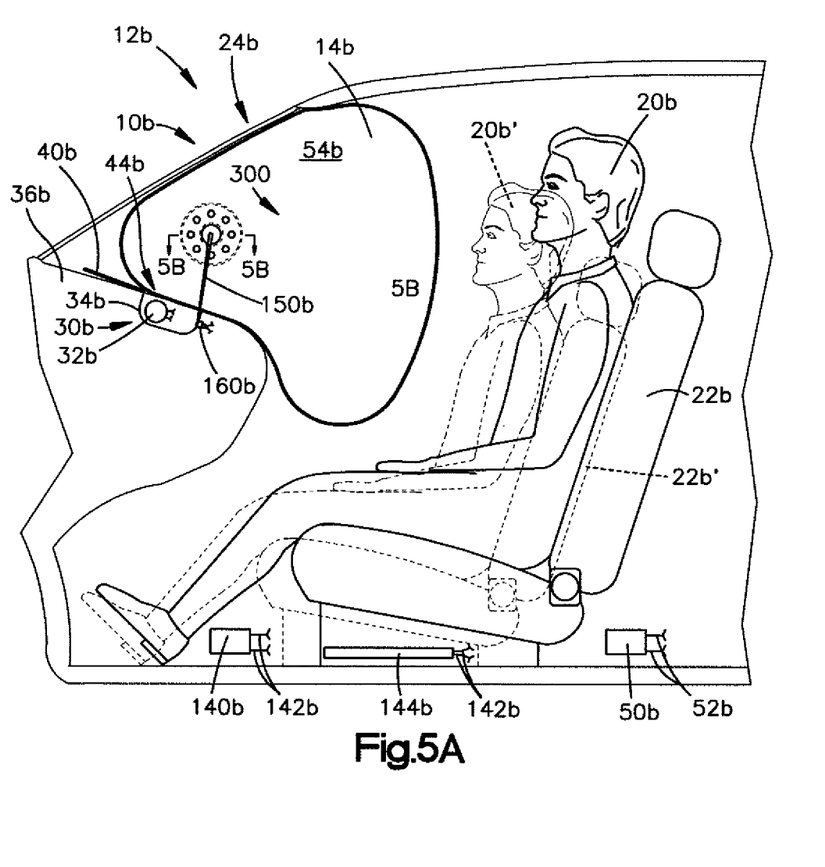
FIG. 5A is a schematic side view of an apparatus for helping to protect an occupant of a vehicle according to a third embodiment of the invention, illustrating the apparatus in an inflated and deployed condition.
Figure 5B:
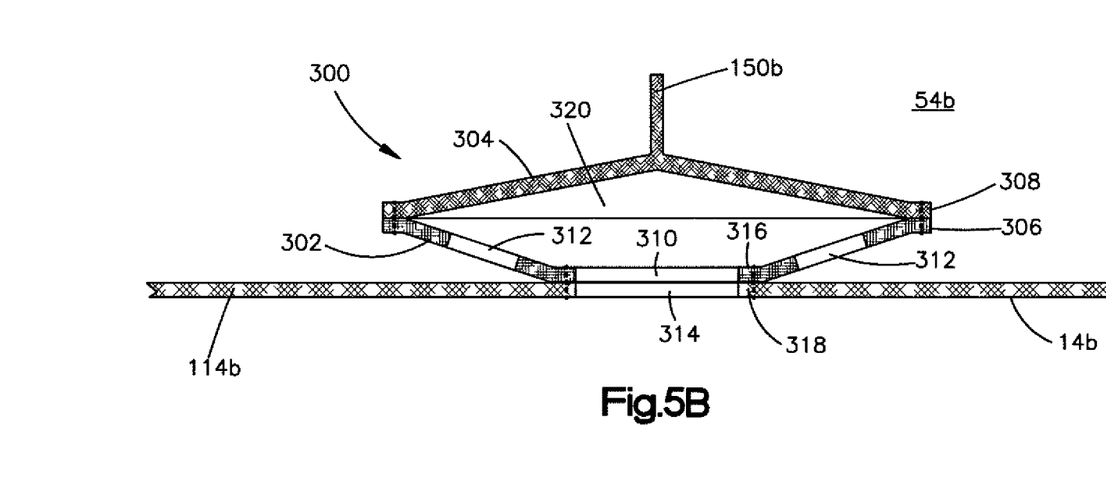
FIGS. 5B and 5C are magnified views illustrating a portion of the apparatus of FIG. 5A in different conditions.
Figure 5C:
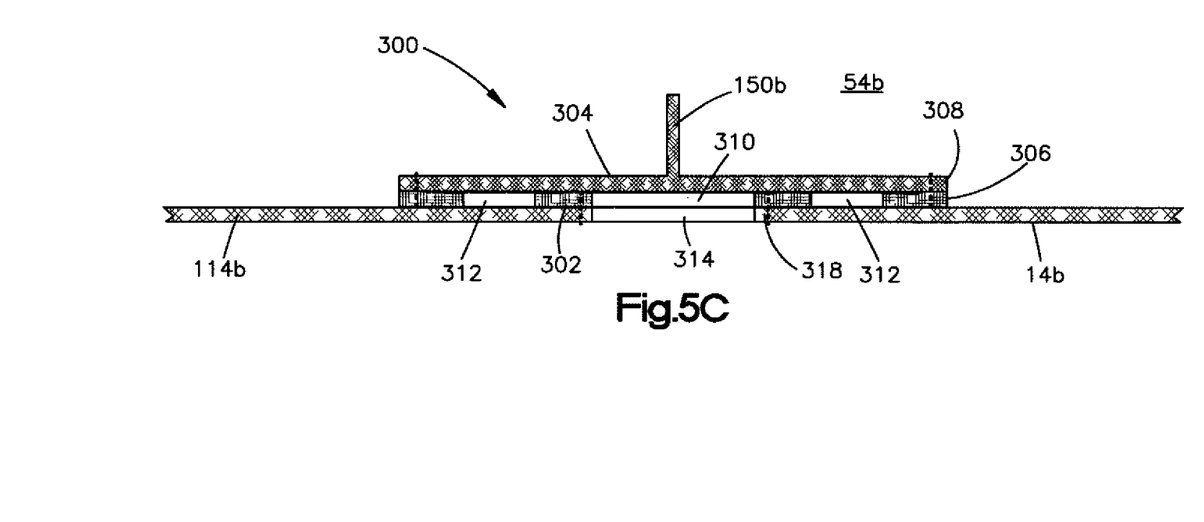

A third embodiment of the present invention is illustrated in FIGS. 5A-5C. Certain components in FIGS. 5A-5C are similar or identical to components of FIGS. 1A-3B. The suffix "b" is added to the reference numbers of these similar or identical components in FIGS. 5A-5C to avoid confusion. The apparatus 10b of the second embodiment includes an air bag 14b that is fitted with a vent 300 having a configuration that differs from the vent 100 illustrated in FIGS. 1A-3B.

Referring to FIG. 5A, an apparatus 10b for helping to protect an occupant 20b of a vehicle 12b includes an inflatable vehicle occupant protection device in the form of an air bag 14b. In the embodiment illustrated in FIGS. 5A-5C, the air bag 14b is a passenger frontal air bag for helping to protect an occupant 20 of a seat 22b on a passenger side 24b of the vehicle 12b.

The air bag 14b may be part of an air bag module 30b that is similar or identical in construction, configuration, and operation to the module 30 of the embodiment of FIGS. 1A-3B. The vent 300, while having a configuration that differs from that illustrated in FIGS. 1A-3B, is configured to operate adaptively in response to vehicle conditions, occupant conditions, or a combination of vehicle and occupant conditions in a manner similar or identical to the embodiment of FIGS. 1A-3B. The apparatus 10b may thus include any of the various controllers and sensors described herein in regard to the embodiment of FIGS. 1A-3B.

Referring to FIGS. 5A-5C, the vent 300 of the third embodiment is actuatable to release inflation fluid from the inflatable volume 54b of the air bag 14b. The vent 300 comprises a first portion comprising a first panel 302 and a second portion comprising a second panel 304. The overlying first and second panels 302 and 304 are arranged in an overlying manner and interconnected about their respective peripheries 306 and 308 by known means, such as stitching or ultrasonic welding. The interconnected first and second panels 302 and 304 define between them a discharge chamber 320. In the embodiment illustrated in FIGS. 5A-5C, the panels 302 and 304 are generally round in configuration. The panels 302 and 304 could have alternative configurations.

The first panel 302 includes a central discharge opening 310 and one or more vent openings 312 spaced about the discharge opening. The discharge opening 310 is positioned adjacent a wall 114b of the air bag 14b in alignment with an opening 314 in the air bag wall 114b. A peripheral portion 316 of the first panel 302 surrounding the discharge opening 310 is interconnected to a peripheral portion 318 of the air bag wall 114b surrounding the discharge opening 314 by known means, such as stitching or ultrasonic welding.

The second panel 304 extends across and covers the discharge opening 310, the vent openings 312, and the discharge opening 314. The vent tether 150b has a first end portion connected to the actuatable device 160b and a second end portion connected to a central portion of the second panel 304.

The vent 300 has an open condition, illustrated in FIG. 5B, and a closed condition, illustrated in FIG. 5C. In the open condition of FIG. 5B, the vent tether 150b tensions or otherwise pulls/maintains the second panel 304 in an open condition in which the second panel is spaced from the first panel 302, thus expanding the discharge chamber 320. When the vent tether 150 pulls on the second panel 304, the tension on the center of the panel is distributed or transferred to the periphery of the panel along the interconnection with the first panel 302. Due to this, as shown in FIG. 5C, the second panel 304 assumes a concave configuration facing away from the inflatable volume 54b toward the discharge openings 310 and 314. The first panel 302 also assumes a concave configuration, but faces into the inflatable volume 54b. It is between these concavely opposed panels 302 and 304 that the discharge chamber 320 is formed.

In the open condition, the vent 300 provides fluid communication between the inflatable volume 54b and the atmosphere surrounding the air bag 14b via the vent openings 312, the discharge chamber 320, and the discharge openings 310 and 314. In the open condition, the vent tether 150b maintains the first panel 302 and second panel 304 in the spaced, concavely opposed conditions illustrated in FIG. 5B.

In the closed condition of FIG. 5C, the vent tether 150b does not tension or otherwise pull/maintain the first and second panels 302 and 304 to the spaced concavely opposed condition illustrated in FIG. 5B. The first and second panels 302 and 304 are thus free to move in response to inflation fluid pressure in the inflatable volume 54b of the air bag 14b. Under the pressure of inflation fluid in the inflatable volume 54, the second panel 304 moves to a closed condition in which it is pressed flat against the first panel 302. In this closed condition, the second panel 304 covers the vent openings 312 and discharge openings 310 and 314. In this closed condition, the discharge chamber 320 is collapsed and its volume is effectively reduced to zero. As a result, the second panel 304 blocks or substantially blocks fluid communication between the inflatable volume 54 and the atmosphere surrounding the air bag 14b. Inflation fluid venting is thus blocked in the closed condition of the vent 300. Advantageously, inflation fluid pressure in the inflatable volume 54b helps press the second panel 304 against the first panel 302 and maintains the first panel impinged between the second panel and the air bag panel 114b.

Those skilled in the art will therefore appreciate that the vent 300 vents inflation fluid from the inflatable volume 54b of the air bag 14b when the vent tether 150b maintains the vent, particularly the second panel 304, in the open condition (FIG. 5B). Those skilled in the art will further appreciate that the vent 300 blocks inflation fluid venting from the inflatable volume 54b of the air bag 14b when the vent tether 150b releases the vent, particularly the second panel 304, to move to the closed condition (FIG. 5C).

Since movement of the first and second panels 302 and 304 that places the vent 300 in the closed condition occurs passively in response to inflation fluid pressure in the inflatable volume 54b (more precisely in response to differential pressure between the inflatable volume 54b inside the air bag 14b and the atmosphere surrounding the air bag 14b), the apparatus 10b can be configured such that actuation of the vent 300 depends on whether the vent tether 150b is anchored in the vehicle 22b. Those skilled in the art will appreciate that the air bag 14b can be configured such that, when the vent tether 150b is anchored, movement of the first and second panels 302 and 304 during air bag deployment can cause the vent tether to become tensioned and thereby maintain the vent 300 in the open condition as described above. Similarly, those skilled in the art will appreciate that the air bag 14b can be configured such that, when the vent tether 150b is released from being anchored, the first and second panels 302 and 304 are similarly released, thereby permitting the panels, and thus the vent 300, to move to the closed condition as described above.

The vent 300 of the embodiment of FIGS. 5A-5C can be adapted to respond to vehicle conditions, occupant conditions, or both to help control inflation and deployment of the air bag 14b. Since the vent 300, as described above, is placed in the open condition in response to the vent tether 150b being anchored, and is placed in the closed condition in response to release of the vent tether 150b, those skilled in the art will appreciate that control of the vent 300 can be implemented actively based on sensed conditions in the vehicle 12b in a manner similar or identical to that described above in regard to the vent 100 of the embodiment of FIGS. 1A-3B.

To achieve this function, the apparatus 10b of may also include the controller(s), sensor(s), wiring, and any other components necessary to actively control the vent 300 based on sensed vehicle conditions, occupant conditions, or a combination of vehicle and occupant conditions when the event for which inflation and deployment of the air bag 14b occurs. As described in regard to the embodiment of FIGS. 1A-3B, these sensed conditions may, for example, include a sensed seat position, a sensed weight on the vehicle seat, a sensed presence of an occupant on the vehicle seat, or a combination of these conditions. The apparatus 10b may thus, for example, be adapted to respond to the size or position of the vehicle occupant. Alternative sensors, such as optical or ultrasonic sensors, may also be used to determine presence and/or position of an occupant on the seat.

Additionally, the adaptive functionality of the apparatus 10b is not limited to forward/rearward positioned occupant position per se. For example, the apparatus 10b could function similarly to vent inflation fluid from the air bag in response to sensing the presence of a child safety seat positioned on the vehicle seat. This may be determined, for example, via a seatbelt tension sensor (not shown) operatively connected to the controller. As another example, the vent tether 150*b* could function similarly to control venting of the air bag 14*b* in the event of an extremely large occupant, without regard to the forward/rearward position of the seat, based on the sensed weight on the seat. As a further example, the vent tether 150*b* could function similarly to control venting of the air bag 14*b* in the event of an occupant positioned away from a normal seating position, such as a leaned-over or leaned-forward position, without regard to the forward/rearward position of the seat and without regard to the occupant's size, as determined by an occupant position sensor (e.g., an optical or ultrasonic sensor), or a seatbelt extension sensor (not shown) operatively connected to the controller.

From the above description of the invention, those skilled in the art will perceive improvements, changes and modifications. For example, although the embodiments disclosed herein are illustrated in implementations on a passenger side of the vehicle, those skilled in the art will appreciate that the present invention is intended for and may be implemented on either the driver side of the vehicle or the passenger side of the vehicle. In a driver side implementation, the apparatus would simply be mounted to the vehicle steering wheel instead of being mounted to the instrument panel. While, in this instance, the overall shape of a steering wheel mounted air bag may differ from that of the instrument panel mounted air bag, the basic function of the adaptive tether and vent would be virtually identical. Additionally, more than one vent/tether combination may be implemented in the air bag configurations of any of the embodiments disclosed herein. The above and other such improvements, changes and modifications within the skill of the art are intended to be covered by the appended claims.

Having described the invention, the following is claimed:

1. An apparatus for helping to protect an occupant of a vehicle, the apparatus comprising:
    an inflatable vehicle occupant protection device comprising a panel that at least partially defines an inflatable volume of the protection device; and
    a vent comprising a sidewall that extends through the panel and defines a passage for venting inflation fluid from the inflatable volume, the vent comprising a first portion extendable inside the inflatable volume and an opposite second portion extendable outside the inflatable volume;
    the vent having an open condition in which the first portion is maintained inside the inflatable volume and thereby permits venting of inflation fluid through the passage,
    the vent having a closed condition in which the first portion is inverted and positioned in the second portion thereby blocking inflation fluid from venting through the passage.

2. The apparatus recited in claim 1, further comprising a tether having a first end portion connected to the first portion of the vent and a second end portion releasably anchored in the vehicle.

3. The apparatus recited in claim 2, wherein the tether is releasable to place the vent in the closed condition.

4. The apparatus recited in claim 2, wherein the tether when anchored maintains the vent in the open condition.

5. The apparatus recited in claim 1, wherein the sidewall comprises a cylindrical tube.

6. The apparatus recited in claim 5, wherein the second portion of the vent has diameter that is smaller than a diameter of the first portion of the vent.

7. The apparatus recited in claim 1, wherein the first portion of the sidewall has a base portion positioned adjacent the panel, the first portion having a conical configuration extending away from the base portion into the inflatable volume, the second portion of the sidewall having a base portion positioned adjacent the panel and having a conical configuration extending outside and away from the inflatable volume.

8. The apparatus recited in claim 7, wherein the conical sidewall of the first portion mates with the conical sidewall of the second portion when the vent is in the closed condition.

9. The apparatus recited in claim 1, wherein the sidewall has a generally tubular construction, the sidewall having a cross-sectional shape that mates with an opening in the panel through which the sidewall extends.

10. The apparatus recited in claim 9, wherein the side wall is connected to a portion of the panel extending around the periphery of the opening.

11. The apparatus recited in claim 9, wherein the second portion of the vent has cross-sectional area that is smaller than a cross-sectional area of the first portion of the vent.

12. The apparatus recited in claim 1, wherein the first portion of the vent comprises vent openings that extend through the sidewall.

13. The apparatus recited in claim 12, wherein the first and second portions are configured so that the first portion, when inverted and positioned in the portion of the passage defined by the second portion, mates with the second portion and is constrained by the second portion, which causes the sidewall of the first portion to be pressed against the sidewall of the second portion by the pressure of inflation fluid in the inflatable volume, thereby forming a seal between the first and second portions that prevents inflation fluid leakage through the vent holes.

14. The apparatus recited in claim 12, wherein the vent openings provide fluid communication between the inflatable volume of the protection device and the passage when the vent is in the open condition, thereby permitting inflation fluid flow through the openings and through the passage to vent inflation fluid from the protection device.

15. The apparatus recited in claim 12, wherein the first portion is configured to position the vent openings against an interior wall of the second portion of the vent when the vent is in the closed condition.

16. The apparatus recited in claim 1, wherein the first portion is configured such that inflation fluid pressure in the inflatable volume acts on the first portion to urge the first portion to become inverted and positioned in the second portion.

17. The apparatus recited in claim 1, wherein the first portion of the vent comprises a closed end, inflation fluid pressure in the inflatable volume acting on the closed end of the first portion to urge the first portion to become inverted and positioned in the second portion.

18. An apparatus for helping to protect an occupant of a vehicle, the apparatus comprising:
    an inflatable vehicle occupant protection device;
    a vent for venting inflation fluid from the protection device, the vent comprising a conduit having a first portion extending inside the protection device and an opposite second portion extending outside the protection device; and
    a tether having a first end portion connected to the first portion of the vent and a second end portion releasably anchored in the vehicle;
    the vent having an open condition in which the tether is anchored and thereby maintains the first portion positioned in the protection device so that inflation fluid vents through the conduit;
    the vent having a closed condition in which the tether is released and thereby permits the first portion to become inverted and positioned in the second portion, which blocks inflation fluid from venting through the conduit.

19. The apparatus recited in claim 18, wherein the first portion of the conduit comprises a closed end and vent openings that extend through a sidewall of the conduit.

20. The apparatus recited in claim 19, wherein the vent openings provide fluid communication between the protection device and the conduit when the vent is in the open condition, thereby permitting inflation fluid flow through the openings and through the conduit to vent inflation fluid from the protection device.

21. The apparatus recited in claim 19, wherein the first portion is configured to position the vent openings against an interior wall of the second portion of the conduit when the vent is in the closed condition.

22. The apparatus recited in claim 18, wherein the first portion is configured such that inflation fluid pressure in the protection device acts on the first portion to urge the first portion to become inverted and positioned in the second portion.

23. An apparatus for helping to protect an occupant of a vehicle, the apparatus comprising:
an inflatable vehicle occupant protection device; and
a vent comprising first and second tubular portions, the second tubular portion extending outside the protection device;
the vent having an open condition in which the first tubular portion extends inside the protection device and thereby permits venting of inflation fluid through the vent,
the vent having a closed condition in which the first tubular portion is inverted and extends at least partially into the second tubular portion, the second tubular portion blocking inflation fluid from venting through the vent.

24. The apparatus recited in claim 23, further comprising a tether having a first end portion connected to the first tubular portion and a second end portion anchored in the vehicle, the anchored tether maintaining the vent in the open condition, the anchored second end portion of the tether being releasable to place the vent in the closed condition.

25. The apparatus recited in claim 24, wherein the protection device comprises a panel that at least partially defines an inflatable volume of the protection device, the first and second tubular portions comprising portions of a tubular structure that extends through an opening in the panel and is connected to portions of the panel surrounding the opening.

26. The apparatus recited in claim 23, wherein the first tubular portion is configured such that inflation fluid pressure in the protection device acts on the first tubular portion to urge the first tubular portion to become inverted and positioned in the second tubular portion.

27. An apparatus for helping to protect an occupant of a vehicle, the apparatus comprising:
an inflatable vehicle occupant protection device; and
a vent comprising first and second conical portions, the second conical portion extending outside the protection device;
the vent having an open condition in which the first conical portion extends inside the protection device and thereby permits venting of inflation fluid through the vent,
the vent having a closed condition in which the first conical portion is inverted and extends at least partially into the second conical portion, the second conical portion blocking inflation fluid from venting through the vent.

28. The apparatus recited in claim 27, further comprising a tether having a first end portion connected to the first conical portion and a second end portion anchored in the vehicle, the anchored tether maintaining the vent in the open condition, the anchored second end portion of the tether being releasable to place the vent in the closed condition.

29. The apparatus recited in claim 28, wherein the protection device comprises a panel that at least partially defines an inflatable volume of the protection device, the panel comprising an opening through which vented inflation fluid passes, the first and second conical portions having respective base portions connected to portions of the panel surrounding the opening, the first conical portion extending away from the panel into the inflatable volume, the second conical portion extending away from the panel outside inflatable volume.

30. The apparatus recited in claim 27, wherein the first conical portion is configured such that inflation fluid pressure in the protection device acts on the first conical portion to urge the first conical portion to become inverted and positioned in the second conical portion.

31. An apparatus for helping to protect an occupant of a vehicle, the apparatus comprising:
an inflatable vehicle occupant protection device; and
a vent for venting inflation fluid from an inflatable volume of the protection device, the vent comprising at least one panel having opposed first and second portions that define a discharge chamber, the second portion comprising at least one vent opening that provides fluid communication between the inflatable volume and the discharge chamber, the second portion further comprising a discharge opening that provides fluid communication between the discharge chamber and the exterior of the protection device via an opening in a panel of the protection device,
the vent having an open condition in which the first portion of the at least one panel is spaced from the second portion of the at least one panel and thereby allows inflation fluid flow from the inflatable volume into the discharge chamber via the at least one vent opening and to the exterior of the protection device via the discharge opening and the opening in the protection device panel,
the vent having a closed condition in which the first portion of the at least one panel is urged against the second portion of the at least one panel and thereby blocks inflation fluid flow from the inflatable volume into the discharge chamber via the at least one vent opening.

32. The apparatus recited in claim 31, further comprising a tether connected to the second portion of the at least one panel and an actuatable device that releasably anchors the tether in the vehicle, the tether maintaining the vent in the open condition when the actuatable device is maintained in a non-actuated condition, the actuatable device, when actuated, releasing the tether and thereby placing the vent in the closed condition.

33. The apparatus recited in claim 31, wherein the first and second portions comprise separate first and second panels interconnected about their peripheries to define the discharge chamber, the second panel including the discharge opening and being positioned overlying the protection device panel so that the discharge opening is aligned with the vent opening, a portion of the second panel surrounding the discharge opening being interconnected with a portion of the protection device panel surrounding the opening in the protection device panel.

34. The apparatus recited in claim 33, wherein a tether is connected to the first panel at a location aligned with the discharge opening in the second panel.

35. The apparatus recited in claim 33, wherein the vent openings are spaced about the discharge opening in the second panel.

36. The apparatus recited in claim 18, wherein the first and second portions of the vent comprise first and second tubular portions, the second tubular portion extending outside the protection device.

37. The apparatus recited in claim 18, wherein the first and second portions of the vent comprise first and second conical portions, the second conical portion extending outside the protection device.

\* \* \* \* \*